United States Patent [19]

Kurozu et al.

[11] Patent Number: 4,890,038
[45] Date of Patent: Dec. 26, 1989

[54] POWER SUPPLY CIRCUIT FOR AUTOMOTIVE HEADLAMP WITH COMBINATIONAL SWITCH

[75] Inventors: Tomotaka Kurozu, Tokyo, Japan; Sachiro Kataoka, Ann Arbor, Mich.

[73] Assignee: Nissan Motor Co., Ltd., Japan

[21] Appl. No.: 146,403

[22] Filed: Jan. 21, 1988

[30] Foreign Application Priority Data

Jul. 22, 1987 [JP] Japan ................... 62-13126

[51] Int. Cl.$^4$ ............................. B60Q 1/02
[52] U.S. Cl. ........................ 315/82; 315/80; 307/10.8
[58] Field of Search ............ 315/79, 80, 81, 82, 315/83; 307/10 LS

[56] References Cited

U.S. PATENT DOCUMENTS

| 3,500,119 | 1/1967 | Price | 307/10.8 |
|---|---|---|---|
| 4,461,975 | 7/1984 | Osaki et al. | 315/82 |
| 4,613,791 | 9/1988 | Kurihara et al. | 315/82 |
| 4,684,819 | 8/1987 | Harg et al. | 315/82 |
| 4,713,584 | 12/1987 | Jean | 315/82 |
| 4,728,861 | 3/1988 | Kurihara et al. | 307/10 LS |

FOREIGN PATENT DOCUMENTS

| 220962 | 5/1925 | United Kingdom . |
|---|---|---|
| 256460 | 8/1926 | United Kingdom . |
| 282246 | 12/1927 | United Kingdom . |
| 296757 | 8/1928 | United Kingdom . |
| 1134462 | 11/1968 | United Kingdom . |
| 1489401 | 10/1977 | United Kingdom . |

Primary Examiner—Donald J. Yusko
Assistant Examiner—Brian Palladino
Attorney, Agent, or Firm—Leydig, Voit & Mayer

[57] ABSTRACT

A power supply circuit for two automotive headlamps includes a power source supplying electrical power to the headlamps via two fuses, an electrical switch for establishing communication between the headlamps and the power source, a control unit for selectively establishing communication between the headlamps and the power source in series through a single fuse and between the headlamps in parallel and the power source through respective separate fuses, and for blocking communcation between the headlamps and the power source when connected in series and either of the fuses is open.

16 Claims, 2 Drawing Sheets

POWER SUPPLY CIRCUIT FOR AUTOMOTIVE HEADLAMP WITH COMBINATIONAL SWITCH

BACKGROUND OF THE INVENTION

1. Field of the Invention

The present invention relates generally to a power supply circuit for headlamps mounted on automotive vehicles. More specifically, the invention relates to a power supply circuit in which a pair of headlamps can be selectively connected to a power source in series or parallel to decrease or increase luminous intensity thereof.

2. Description of the Prior Art

Such a power supply circuit is described in the Japanese Utility Model First Publication (Jikkai) Showa 59-118648. This circuit comprises a pair of headlamps, a battery, a manually operable switch and a relay which can selectively establish communication between the battery and the headlamps in series or parallel. Each of the headlamps comprises low-beam and high-beam filaments. In this circuit, the headlamps are connected to the battery in parallel via the relay when the switch is OFF so that luminous intensities of the headlamps are relatively high. In response to turning ON of the switch, the headlamps are connected to the battery in series via the relay, so that the intensities can be decreased. In addition, each of the headlamps is provided with a fuse. When the headlamps are connected to the battery in series, the electricity runs through only one of the fuses which is provided near the battery. Therefore, if the connection between the other fuse and the high-beam filament is open, undesirable current drain may occur, so that other electronic parts may be broken.

SUMMARY OF THE INVENTION

It is therefore a principal object of the present invention to provide a power supply circuit for automotive headlamps which can block communication between the headlamps and the battery in series when a fuse provided between the headlamps and the battery is broken.

In order to accomplish the aforementioned and other specific objects, the power supply circuit includes a power source supplying electrical power to the headlamps via a fuse; an electrical wire establishing communication between one of the headlamps and the power source at a first position of a combination switch; a control unit selectively establishing communication between the other headlamp and the power source at the first position and between both of the headlamps and the power source in series at a second position of the combination switch; and means for detecting an open fuse that blocks communication between the headlamps and the power source in series.

According to one aspect of the present invention, the power supply circuit for an automotive headlamp system including first and second headlamps comprises:

a power source for supplying electrical power to the headlamp system via a fuse;

a switch assembly selectively operable between a plurality of switch positions including a first position at which a first magnitude of electric current is supplied to the first and second headlamps for dimmer lighting, and a second position at which a second magnitude of electric current greater than said first magnitude is supplied to the first and second headlamps;

a current control circuit, interposed between the power source and the first and second headlamps for adjusting the current to be supplied to the first and second headlamps;

a first circuit establishing a series circuit including the power source and the first and second headlamps for supplying the first magnitude of electric current via the current control circuit when the switch assembly is at the first position, the first circuit blocking communication between the power source and the first and second headlamps when the fuse is open; and a second circuit connecting each of the first and second headlamps in parallel to the power source when the switch assembly is at the second position, the second circuit connecting the second headlamps to the power source via the current control circuit and the first headlamp to the power source via a bypass circuit bypassing the control circuit when the switch assembly is at the second position.

The current control circuit may include a relay which establishes communication between the first and second headlamps and the power source in response to turning ON of the relay. The current control circuit may also include a transistor which turns the relay off when the transistor is turned ON. The power supply circuit may further include means for indicating whether said headlamps are connected to said power source in series or parallel.

According to another aspect of the invention, the power supply circuit for an automotive headlamp system including first and second headlamps, each of which includes a low-beam filament for low beam lighting and a high-beam filament for high beam lighting comprises:

a power source for supplying electrical power to the headlamp system via a fuse;

a switch assembly selectively operable between a plurality of switch position including a first position at which a first magnitude of electric current is supplied to the low-beam filaments of the first and second headlamps for dimmer lighting, and a second position at which a second magnitude of electric current greater than the first magnitude is supplied to the first and second headlamps, the switch assembly, at the second position, being further operable between a high beam position at which the second magnitude of electric current is supplied to the high-beam filaments of the first and second headlamps and a low beam position at which the second magnitude of electric current is supplied to the low-beam filaments of the first and second headlamps;

a current control circuit, interposed between the power source and the first and second headlamps, for adjusting the magnitude of the current supplied to the first and second headlamps;

a first circuit establishing a series circuit including the power source and the low-beam filaments of the first and second headlamps for supplying the first magnitude of electric current via the current control circuit when the switch assembly is at the first position, the first circuit blocking communication between the power source and the low-beam filaments when the fuse is open; and a second circuit connecting the low-beam filaments of the first and second headlamps in parallel to the power source when the switch assembly is in the low beam position, and the high-beam filaments of the first and second headlamps in parallel to the power source when the switch assembly is in the high beam position, the second circuit connecting the second headlamp to the power source via the current control circuit and the first headlamp to the power source via a bypass circuit bypassing the control circuit, when the switch assembly is in the second position.

According another aspect of the invention, the power supply circuit for an automotive headlamp system including first and second headlamps comprises:

a power source for supplying electrical power to the headlamp system via a fuse;

a switch assembly selectively operable between a first position at which a first magnitude of electric current is supplied to the first and second headlamps for dimmer lighting, and a second position at which a second magnitude of electric current greater than the first magnitude is supplied to the first and second headlamps;

first means, cooperative with the switch assembly, for connecting the first headlamp to the power source in the second position; and second means, cooperative with the switch assembly, for connecting the second headlamp to the power source at the second position and for establishing a series circuit including the first and second headlamps and the power source in the first position, the second means blocking communication between the first and second headlamps and the power source when the fuse is open.

According another aspect of the invention, the power supply circuit for an automotive headlamp system including first and second headlamps, each of which includes a low-beam filament for low beam lighting and a high-beam filament for high beam lighting comprises:

a power source for supplying electrical power to the headlamp system via a fuse;

a switch assembly selectively operable between a plurality of switch positions including a first position at which a first magnitude of electric current is supplied to said low-beam filaments of the first and second headlamps for dimmer lighting, and a second position at which a second magnitude of electric current greater than the first magnitude is supplied to the first and second headlamps, the switch assembly, at the second position, being further operable between a high beam position at which the second magnitude of electric current is supplied to the high-beam filaments of the first and second headlamps and a low position at which the second magnitude of electric current is supplied to the low-beam filaments of the first and second headlamps;

first means, cooperative with the switch assembly, for connecting the high-beam filament of the first headlamp to the power source at the high beam position and the low-beam filament of the first headlamp to the power source at the low beam position when the switch assembly is switched to the second position; and second means, cooperative with the switch assembly, for connecting the high-beam filament of the second headlamp to the power source at the high beam position and the low-beam filament of the second headlamp to the power source at the low-beam position when the switch assembly is switched to the second position, and for establishing a series circuit including the low-beam filaments of the first and second headlamps and the power source at the first position, the second means blocking communication between the low-beam filaments of the first and second headlamps and the power source in series when the fuse is open.

DESCRIPTION OF THE PREFERRED EMBODIMENTS

Figure 1:
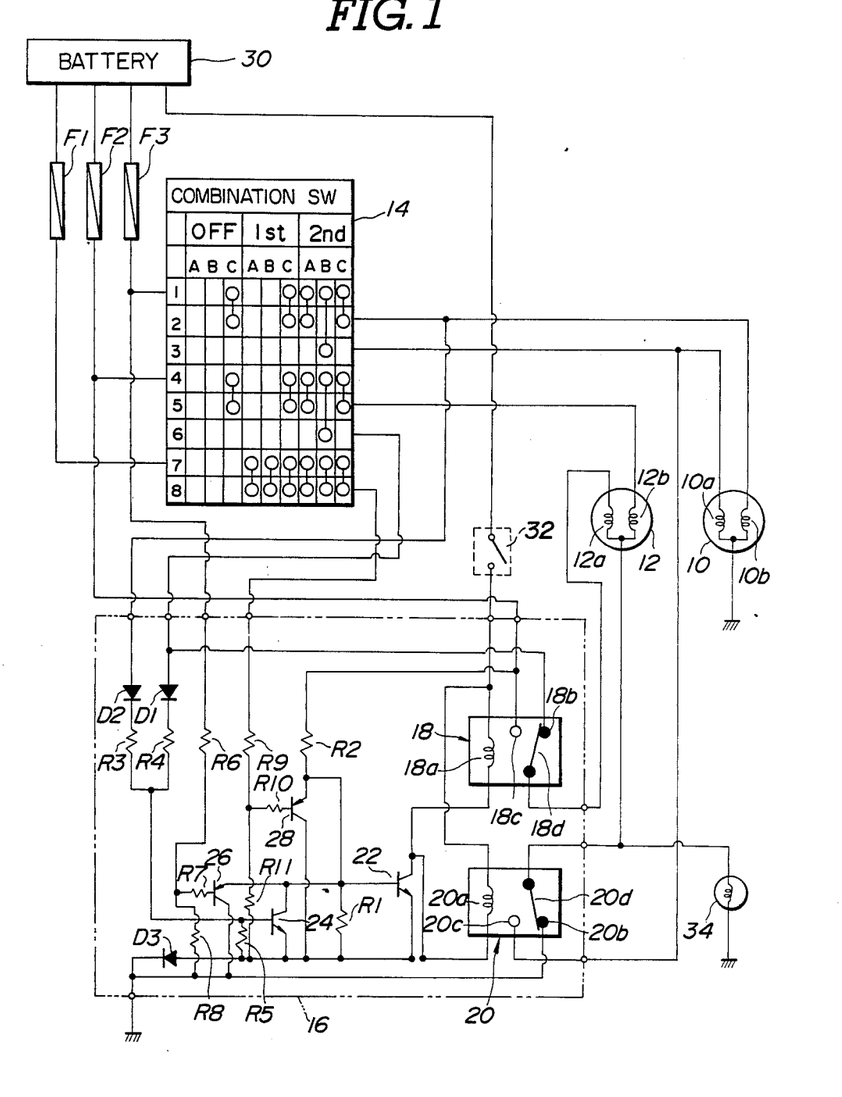
FIG. 1 is a circuit diagram of a first preferred embodiment of a power supply circuit according to the present invention.

Referring now to FIG. 1, a power supply circuit includes right and left headlamps 10 and 12, each of which comprises a low-beam filament $10a$ or $12a$ and a high-beam filament $10b$ or $12b$.

The power supply circuit also includes a combination switch 14 which has eight terminals 1 to 8. The combination switch 14 has three positions: an OFF position at which the low-beam filaments $10a$ and $12a$ are turned off, a first position at which the low-beam filaments $10a$ and $12a$ are connected to each other in series to emit dimmer light, and a second position at which the low-beam filaments $10a$ and $12a$ or the high-beam filaments $10b$ and $12b$ are connected to each other in parallel to emit brighter light. At each of these positions, the combination switch 14 has three positions: a high beam position, a low beam position and a flashing position. In the flashing position, the high-beam filaments $10b$ and $12b$ are temporarily connected to each other in parallel to emit brighter light in order to warn the occupant of a vehicle ahead. The high beam, low beam and flashing positions will be hereafter referred as to "position A", "position B" and "position C", respectively. At the OFF position, the terminals 1 and 4 are electrically connected to the terminals 2 and 5, respectively, when the combination switch 14 is switched to the position C. At the first position, the terminal 7 is electrically connected to the terminal 8 when the combination switch 14 is switched to any of position A, B or C. In addition, when the combination switch 14 is switched to the position C, the terminals 1 and 4 are electrically connected to the terminals 2 and 5, respectively. At the second position, the terminals 1, 4 and 7 are electrically connected to the terminals 2, 5 and 8, respectively, when the combination switch 14 is switched to the position A or C. When the combination switch 14 is switched to the position B, the terminals 1, 4 and 7 are electrically connected to the terminals 3, 6 and 8, respectively.

The terminals 1, 4 and 7 of the combination switch 14 are electrically connected to a battery 30 serving as a power source via fuses $F_1$, $F_2$ and $F_3$ respectively.

The power supply circuit further includes a control unit 16 which comprises relays 18 and 20, transistors 22, 24, 26 and 28, and diodes $D_1$, $D_2$ and $D_3$. The relay 18 comprises a relay coil $18a$, stationary terminals $18b$ and $18c$ and a movable contact $18d$ which is movable between the stationary terminals $18b$ and $18c$ due to the exciting force of the relay coil $18a$. The movable contact $18d$ is electrically connected to the terminal $18b$ when the electricity does not flow through the relay coil 18, and is connected to the terminal $18c$ when sufficient current flows through the relay coil 18. The relay 20 comprises a relay coil $20a$, stationary terminals $20b$ and $20c$ and a movable contact $20d$ which is movable in the same manner as that of the relay 18.

One end of each of the relay coils $18a$ and $20a$ is connected to the battery 30 via an ignition switch 32.

The other ends of the relay coils are respectively connected to the collector electrode of the transistor 22, the emitter electrode of which is connected to ground via the diode $D_3$, so that the electricity flows through the relay coils 18a and 20a in response to the turning ON of the transistor 22 when the ignition switch 32 is turned on. The base electrode of the transistor 22 is connected to ground via a resistor $R_1$ and the diode $D_3$ in response to turning ON of the transistors 24, 26 or 28. The base electrode of the transistor 22 is also connected to the battery 30 via a resistor $R_2$ and the fuse $F_2$ in order to apply voltage thereto. The collector electrode of the transistor 24 and the emitter electrodes of the transistors 26 and 28 are electrically connected to the battery 30, via the resistor $R_2$ and the fuse $F_2$. The emitter electrode of the transistor 24 and the collector electrode of the transistor and 28 are connected to ground via the diode $D_3$ and the emitter electrode of the transistor 26 is directly connected to ground. Therefore, the transistor 22 is turned OFF in response to turning ON of the transistors 24, 26 and 28. The base electrode of the transistor 24 is connected to the terminal 2 via the diode $D_2$ and a resistor $R_3$ and to the terminal 6 via the diode $D_1$ and a resistor $R_4$ so that the transistor 24 is turned ON when communication between the terminals 1 and 2 or between the terminals 4 and 6 is established. The base electrode of the transistor 24 is also connected to ground via a resistor $R_5$. The base electrode of the transistor 26 is connected to the battery 30 via the fuse $F_3$ and resistors $R_6$ and $R_7$ in order to apply the desired voltages to the transistor 26. The base electrode of the transistor 26 is also connected to ground via the resistor $R_7$ and a resistor $R_8$. The base electrode of the transistor 28 is connected to the terminal 8 via resistors $R_9$ and $R_{10}$ so that the transistor 28 is turned OFF when the communication between the terminals 7 and 8 is established. The base electrode of the transistor 28 is also connected to ground via the resistor $R_{10}$, a resistor $R_{11}$ and the diode $D_3$.

One end of the high-beam filament 10b and the low-beam filament 10a of the headlamp 10 are electrically connected to the terminals 2 and 3 respectively, and the other ends thereof are connected to ground, so that the high-beam and low-beam filaments 10b and 10a are respectively turned on when communication between the terminals 1 and 2 and between the terminals 1 and 3 respectively are established.

One end of the high beam filament 12b of the headlamp 12 is connected to the terminal 5 of the combination switch 14. One end of the low beam filament 12a of the headlamp 12 is connected to the movable contact 18d of the relay 18, stationary terminal 18b of which is connected to the terminal 6 of the combination switch 14. The other ends of the low beam filament 12a and the high beam filament 12b are connected to the movable contact 20d of the relay 20, the stationary terminal 20b of which is connected to ground. Therefore, the low beam filament 12a and the high beam filament 12b of the headlamp 12 can be respectively on in response to turning OFF of the relays 18 and 20 when communication is established between the terminals 4 and 6 and between the terminals 4 and 5, respectively. The stationary terminal 18c of the relay 18 is connected to the battery 30 via the fuse $F_2$ and the stationary terminal 20c of the relay 20 is connected to the one end of the low beam filament 10a of the headlamp 10, so that the low beam filaments 10a and 12a may be electrically connected to the battery 30 in series to emit dimmer light.

In addition, the movable contact 20d of the relay 20 is connected to an indicator lamp 34 which indicates whether the headlamps 10 and 12 are connected to the battery 30 in series or parallel.

With this construction, when the ignition switch 32 is ON, the operation of the first preferred embodiment of the power supply circuit, according to the present invention, is described below.

(1) OFF Position

When the combination switch 14 is switched to the positions A and B (high beam and low beam modes) at the OFF position, the headlamps 10 and 12 are not turned on.

When the combination switch 14 is switched to the position C, the base electrode of the transistor 24 is electrically connected to the battery 30 via the fuse $F_3$, the terminals 1 and 2 of the combination switch 14, the diode $D_2$ and the resistor $R_3$, so that the transistor 24 is turned ON, thereby the base electrode of the transistor 22 is electrically connected to ground. Therefore, the transistor 22 remains OFF, so that the relays 18 and 20 remain OFF, thereby the movable contacts 18d and 20d are connected to the stationary terminals 18b and 20b respectively. As a result, the electricity flows to ground via the fuse $F_2$, the terminals 4 and 5 of the combination switch 14, the high-beam filament 12b of the headlamp 12, and the movable contact 20d and the stationary terminal 20b of the relay 20. That is, the high-beam filament 12b is electrically connected to the battery 30 and turned on. On the other hand, the high-beam filament 10b of the headlamp 10 is electrically connected to the battery 30 via the fuse $F_3$ and the terminals 1 and 2 of the combination switch 14, so that the high-beam filament 10b is also turned on. In this case, the luminous intensities of headlamps 10 and 12 are relatively high since the high-beam filament 10b and 12b are connected to the battery 30 in parallel. Accordingly, flashing operation, by which the headlamps 10 and 12 are manually switched to the high beam mode for a short time, can be achieved.

(2) First Position

When the combination switch 14 is switched to the position B (low beam mode) at the first position, the base electrode of the transistor 28 is electrically connected to the battery 30 via the terminals 7 and 8 of the combination switch 14 and fuse $F_2$, so that the transistor 28 is turned OFF. The transistors 24 and 26 are also OFF. Therefore, the transistor 22, the base electrode of which is electrically connected to the battery 30 via the resistor $R_2$ and the fuse $F_2$, is turned ON, so that the relays 18 and 20 are turned ON. When the relays 18 and 20 are ON, the movable contacts 18d and 20d are electrically connected to the stationary terminals 18c and 20c respectively. As a result, the electricity flows to ground via the fuse $F_2$, the stationary terminal 18c, the movable contact 18d, the low-beam filament 12a, the movable contact 20d, the stationary terminal 20c and the low-beam filament 10a, so that the low-beam filaments 10a and 12a are turned on. In this case, since the low-beam filaments 10a and 12a are connected to each other in series, the luminous intensities thereof are relatively low, i.e., the emitted light is dimmer than that in parallel. If the fuse $F_2$ is open, the base electrode of the transistor 22 becomes low-level, so that the relays 18 and 20 are turned OFF, thereby the movable contacts 18d and 20d are connected to the stationary terminals 18b and 20b respectively. As a result, the low-beam filaments 10a and 12a are not turned on. If the fuse $F_3$ is open, the base electrode of the transistor 26 becomes low-level, so that the transistor 26 is turned ON, thereby the base electrode of the transistor 22 is connected to ground. As a result, the transistor 22 is turned off, so that the low-beam filaments 10a and 12a are not turned on.

If the voltage applied to the stationary terminal 20c is assumed to be about 6 V when the low-beam filaments 10a and 12a emits the dimmed light (i.e., are connected in series), this voltage is decreased to ground level or earth level when the low-beam filament 12a of the headlamp 12 is open, and is increased to be about 12 V when the low-beam filament 10a of the headlamps 10 is open. As a result, the lighting state of the indicator lamp 34 is changed and therefore whether or not the filament 10a or 12a is open can be observed by the indicator lamp 34.

When the combination switch 14 is switched to the position C (flashing mode), the base electrode of the transistor 24 is electrically connected to the battery 30 via the terminals 1 and 2 of the combination switch 14, the diode $D_2$ and the resistor $R_3$. Therefore, the transistor 24 is turned ON, so that the base electrode of the transistor 22 is electrically connected to ground. Therefore, the relays 18 and 20 are OFF since the transistor 22 is OFF. When the relays 18 and 20 are OFF, the movable contacts 18d and 20d are electrically connected to the stationary terminals 18b and 20b respectively. As a result, the electricity flows through two circuits, one of which establishes communication between the battery 30 and ground via the fuse $F_3$, the terminals 1 and 2 and the high-beam filament 10b of the headlamp 10, and the other of which establishes communication between the battery 30 and ground via the fuse $F_2$, the terminals 4 and 5 of the combination switch 14, the high-beam filament 12b of the headlamp 12, and the movable contact 20d and the stationary terminal 20b of the relay 20. Accordingly, the headlamps 10 and 12 are electrically connected to the battery 30 in parallel and turned on. In this case, the luminous intensities thereof are higher than that when the the headlamps 10 and 12 are connected to battery 30 in series. Therefore, the high beam flashing operation can be achieved.

Furthermore, when the combination switch 14 is switched to the position A, as can be seen from FIG. 1, the same connections are made as when the switch is in the B position. Therefore, in the A position the low beam headlamp filaments 10a and 12a are connected in series and the luminous intensities of the headlamps 10 and 12 remain small. When the ignition switch 32 is OFF, the headlamps 10 and 12 are not turned on since the relays 18 and 20 are OFF.

(3) Second Position

When the combination switch 14 is switched to the position B (low beam mode) at the second position, the base electrode of the transistor 24 is electrically connected to the battery 30 via the fuse $F_2$, the terminals 4 and 6 of the combination switch 14, the diode $D_1$ and the resistor $R_4$, so that the transistor 24 is turned ON. Therefore, since the base electrode of the transistor 22 is connected to ground via the transistor 24, the transistor 22 is turned OFF. Therefore, the relays 18 and 20 are OFF, so that the movable contacts 18d and 20d are electrically connected to the stationary terminals 18b and 20b,respectively. As a result, the electricity flows through two circuits, one of which establishes communication between the battery 30 and ground via the fuse $F_3$, the terminals 1 and 3 of the combination switch 14 and the low-beam filament 10a of the headlamp 10, and the other of which establishes the communication between the battery 30 and ground via the fuse $F_2$, the terminals 4 and 6, the stationary terminal 18b and the movable contact 18d of the relay 18, the low-beam filament 12a of the headlamp 12 and the movable contact 20d and the stationary terminal 20b of the relay 20. Accordingly, the low-beam filaments 10a and 12a are electrically connected to the battery 30 in parallel to emit brighter light.

When the combination switch 14 is switched to the position A (high beam mode), the base electrode of the transistor 24 is electrically connected to the battery 30 via the fuse $F_3$, the terminals 1 and 2 of the combination switch 14, the diode $D_2$ and the resistor $R_3$, so that the transistor 24 is turned ON, thereby turning the transistor 22 OFF. Therefore, the relays 18 and 20 remain OFF, so that the movable contacts 18d and 20d are electrically connected to the stationary terminals 18b and 20b respectively. As a result, two independent circuits are established, one of which comprises the battery 30, the fuse $F_3$, the terminals 1 and 2, the high-beam filament 10b of the headlamp 10, and ground, and the other of which comprises the battery 30, the fuse $F_2$, the terminals 4 and 5 of the combination switch 14, the high-beam filament 12b of the headlamp 12, the movable contact 20d and the stationary terminal 20b of the relay 20, and ground. That is, the high-beam filaments 10b and 12b are electrically connected to the battery 30 in parallel and are turned on with relatively high intensities.

When the combination switch 14 is switched to the position C (flashing mode), the same connections are made as when the combination switch is in position A. Therefore, the headlamps 10 and 12 are turned on just as when combination switch 14 is in the position A. In cases where the combination switch 14 is switched to the position A and C at the second position, the headlamps 10 and 12 can also be turned on when the ignition switch 32 is OFF.

Figure 2:
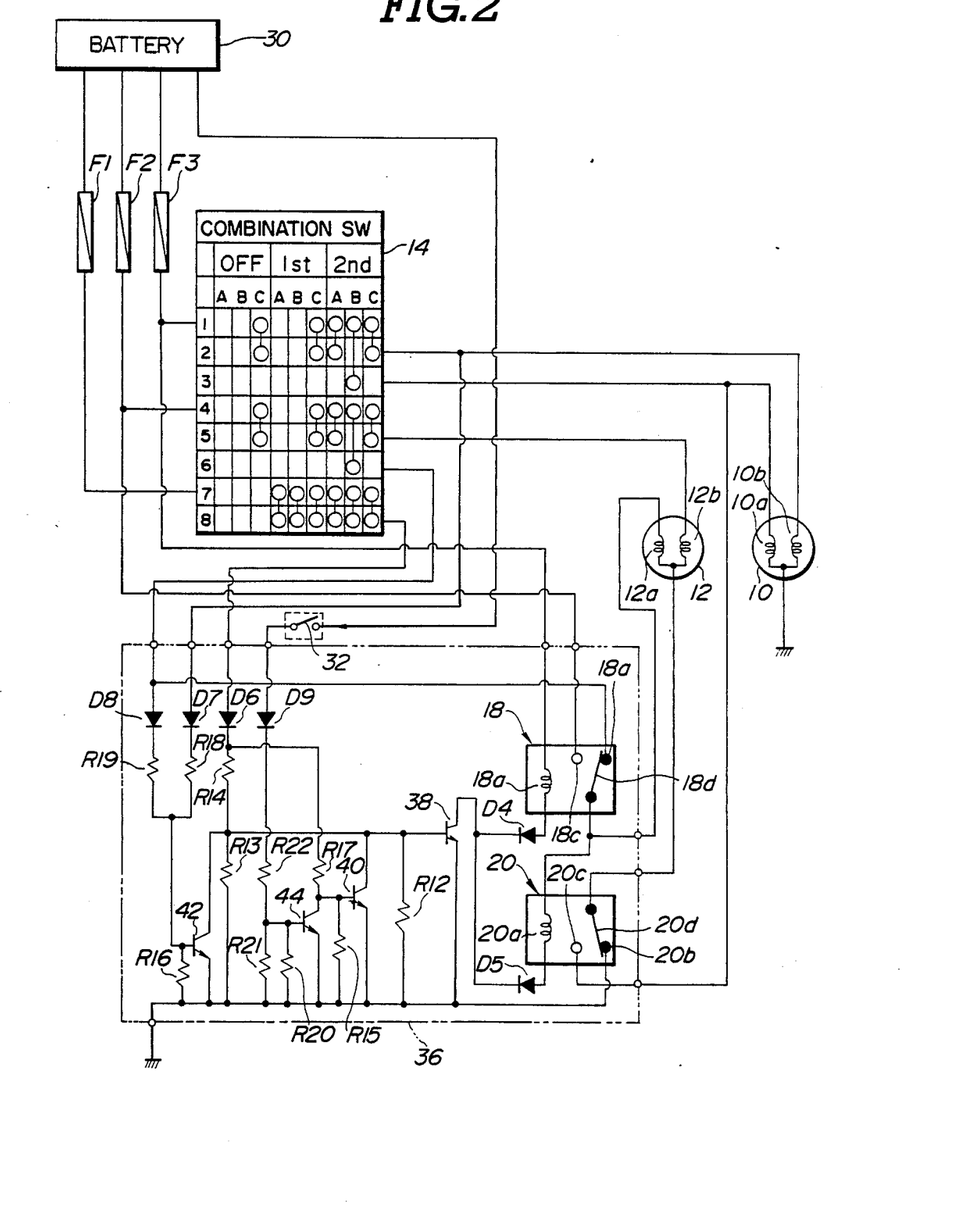
FIG. 2 is a circuit diagram of a second preferred embodiment of a power supply circuit according to the invention.

FIG. 2 shows a second preferred embodiment of a power supply circuit for automotive headlamps according to the present invention.

Similar to the embodiment of FIG. 1, the power supply circuit includes the right and left headlamps 10 and 12 and the combination switch 14, the terminals 1, 4 and 7 of which are electrically connected to the battery 30 via the fuses $F_1$, $F_2$ and $F_3$, respectively. According to this embodiment, the power supply circuit includes a control unit 36 which comprises the relays 18 and 20 similar to those of FIG. 1, transistors 38, 40, 42 and 44, and diodes $D_4$ to $D_9$, instead of the control unit 16.

One end of the relay coil 18a of the relay 18 is electrically connected to the battery 30 via the fuse $F_3$ in order to supply electrical power to the relay coil 18a. The other end of the relay coil 18a is electrically connected to the collector electrode of the transistor 38 via the diode $D_4$. The emitter electrode of the transistor 38 is connected to ground, so that the relay 18 is turned ON in reponse to turning ON of the transistor 38. On the other hand, one end of the relay coil 20a of the relay 20 is connected to the movable contact 18d of the relay 18, the stationary terminal 18c of which is connected to the battery 30 via the fuse $F_2$. The other end of the relay coil 20a is connected to the collector electrode of the transistor 38 via the diode $D_5$, so that the relay 20 is turned ON in response to turning ON of the transistor 38 when the relay 18 is ON.

The base electrode of the transistor 38 is electrically connected to ground via resistors $R_{12}$ and $R_{13}$ which are connected in parallel. Resistors $R_{12}$ and $R_{13}$ are effectively short circuited to ground by the turning ON of either of the transistors 40 or 42. The base electrode of the transistor 38 is also connected to the terminal 8 of the combination switch 14 via a resistor $R_{14}$ and the diode $D_6$ in order to apply voltage thereto when the communication between the terminals 7 and 8 is established. The collector electrodes of the transistors 40 and 42 are electrically connected to the base electrode of the transistor 38. The base electrodes of transistors 40 and 42 are connected to ground through the resistors $R_{15}$ and $R_{16}$, respectively, so that the transistor 38 is turned OFF in response to turning ON of either of the transistors 40 or 42. The base electrode of the transistor 40 is also connected to the terminal 8 of the combination switch 14 via a resistor $R_{17}$ and the diode $D_6$ in order to apply voltage thereto when communication between the terminals 7 and 8 is established. The base terminal of the transistor 42 is also connected to terminal 2 of the combination switch 14 via a resistor $R_{18}$ and the diode $D_7$, and to terminal 6 via a resistor $R_{19}$ and the diode $D_8$ in order to apply voltage thereto when communications between the terminals 1 and 2 and between the terminals 4 and 6 respectively, are established.

In addition, the base electrode of the transistor 40 is connected to the collector electrode of the transistor 44, the emitter electrode of which is connected to ground and the base electrode of which is connected to ground via resistors $R_{20}$ and $R_{21}$ connected in parallel. The transistor 40 is turned OFF in response to turning ON of the transistor 44. The base electrode of the transistor 44 is also connected to the battery 30 via a resistor $R_{22}$, the diode $D_9$ and the ignition switch 32.

Similar to the embodiment of FIG. 1, one end of the high-beam filament 10b and of the low-beam filament 10a respectively of the headlamp 10 are electrically connected to the terminals 2 and 3 of combination switch 14, and the other ends thereof are connected to ground in parallel, so that the high-beam and low-beam filaments 10b and 10a are turned on when communication between the terminals 1 and 2 and between the terminals 1 and 3, respectively, are established.

One end of the high-beam filament 12b of the headlamp 12 is connected to the terminal 5 of the combination switch 14. One end of the low-beam filament 12a of the headlamp 12 is connected to the movable contact 18d of the relay 18, the stationary terminal 18b of which is connected to the terminal 2 of the combination switch 14. The other ends of the low-beam filament 12a and the high-beam filament 12b of the headlamp 12 are connected to the movable contact 20d of the relay 20, the stationary terminal 20b of which is connected to ground. Therefore, the low-beam filament 12a and the high-beam filament 12b can be turned on in response to turning OFF of the relays 18 and 20 when communication between the terminals 1 and 2 and between terminals 4 and 5, respectively, are established. The stationary terminal 20c of the relay 20 is connected to the one end of the low-beam filament 10a of the headlamp 10, so that the low-beam filaments 10a and 12a can be electrically connected to the battery 30 in series to emit dimmer light since, as mentioned above, the stationary terminal 18c of the relay 18 is connected to the battery 30 via the fuse $F_2$ With this construction, when the ignition switch 32 is turned on, the operation of the power supply circuit of FIG. 2, according to the invention, is as described below.

When the combination switch 14 is switched to the position B (low beam mode) at the first position, the base electrodes of the transistors 38 and 40 are electrically connected to the battery 30 via the fuse $F_1$, the terminals 7 and 8 of the combination switch 14, the diode $D_6$ and the resistors $R_{14}$ and $R_{17}$. On the other hand, high level voltage is applied to the base electrode of the transistor 44 since that base electrode is connected to the battery 30 via the ignition switch 32, the diode $D_9$ and the resistor $R_{22}$. Therefore, the transistor 40 is OFF, so that the transistor 38 is ON since the transistor 42 is also OFF. When the transistor 38 is ON, the relay 18 is turned ON, so that the relay 20 is also turned ON. As a result, the electricity flows into ground via the fuse $F_2$, the stationary terminal 18c and the movable contact 18d of the relay 18, the low-beam filament 12a of the headlamp 12, the movable contact 20d and the stationary terminal 20c of the relay 20, and the low-beam filament 10a of the headlamp 10, so that the low-beam filaments 10a and 12a are turned on. In this case, since the low-beam filaments 10a and 12a are connected to each other in series, the luminous intensities thereof are relatively low, or the emitted light is dimmer than that when those filaments are connected in parallel.

When the fuse $F_3$ is open, the relay 18 is not turned ON since communication between the battery 30 and the relay coil 18a of the relay 18 is blocked. As a result, communication between the battery 30 and the relay coil 20a of the relay 20 is also blocked. Therefore, the series circuit including the low-beam filaments 10a and 12a is not established. When the fuse $F_2$ is open, the relay 20 is not turned on since communication between the battery 30 and the stationary terminal 18c of the relay 18 is blocked. Therefore, the series circuit is not established.

According to the embodiment of FIG. 2, it is possible to prevent draining of the battery 30 since this embodiment does not use any element, such as the transistor 26 of the embodiment of FIG. 1, through which current flows even when the headlamps are not lit.

When the combination switch 14 is switched to the other positions, i.e. to the positions A and C at the first position, and to the positions A, B and C at the OFF position and second position, the operations are essentially similar to those of the embodiment of FIG. 1.

According to the present invention, it is possible to prevent undesirable current drain since a series circuit is not established if the combination switch is switched to the dimmer light position when a fuse is open.

What is claimed is:

1. A power supply circuit for an automotive headlamp system including first and second headlamps comprising:
    a power source for supplying electrical power to each of first and second headlamps via first and second fuses;
    a switch assembly selectively operable between a plurality of switch positions including a first position for supplying a first magnitude electric current to the first and second headlamps through one of the first and second fuses for dimmer lighting, and a second position for supplying a second magnitude electric current greater than the first magnitude to the first headlamp through the first fuse and to the second headlamp through the second fuse; and a current control circuit interposed between said power source and the first and second headlamps for controlling the current to be supplied to the first and second headlamps in response to the position of said switch assembly, said current control circuit including first circuit means for establishing a series circuit including said power source and the first and second headlamps for supplying the first magnitude electric current through one of the first and second fuses via said current control circuit when said switch assembly is in the first position, said first circuit means blocking communication between said power source and the first and second headlamps in series when either of the first and second fuses is open and second circuit means for connecting each of the first and second headlamps to said power source in parallel through the first and second fuses, respectively.

2. A power supply circuit as set forth in claim 1 wherein said current control circuit includes a relay for establishing communication between the first and second headlamps and said power source in series in response to turning ON of said relay.

3. A power supply circuit as set forth in claim 2 wherein said current control circuit includes a transistor for turning said relay OFF in response to turning ON of said transistor.

4. A power supply circuit as set forth in claim 3 comprising means for indicating whether the headlamps are connected to said power source in series or parallel.

5. A power supply circuit for an automotive headlamp system including first and second headlamps, each of which includes a low-beam filament for low beam lighting and a high-beam filament for high beam lighting, comprising:

a power source for supplying electrical power to each of first and second headlamps via first and second fuses, each headlamp having a low-beam filament for low beam lighting and a high-beam filament for high beam lighting;

a switch assembly selectively operable between a plurality of switch positions including a first position for supplying a first magnitude electric current to the low-beam filaments of the first and second headlamps through one of the first and second fuses for dimmer lighting, and a second position for supplying a second magnitude electric current greater than the first magnitude to the first headlamp through the first fuse and to the second headlamp through the second fuse, said switch assembly, at the second position, being further operable between a high beam position at which an electric current is supplied to the high-beam filaments of the first and second headlamps and a low beam position at which the second magnitude electric current is supplied to the low-beam filaments of the first and second headlamps;

a current control circuit, interposed between said power source and the first and second headlamps, for controlling the current to be supplied to the first and second headlamps in response to the position of said switch assembly, said current control circuit including first circuit means for establishing a series circuit including said power source and the low-beam filaments of the first and second headlamps for supplying the first magnitude electric current from said power source through one of the first and second fuses via said current control circuit when said switch assembly is in the first position, said first circuit means blocking communication between said power source and the low-beam filaments in series when either of the first and second fuses is open and second circuit means for connecting the low-beam filaments of the first and second headlamps to said power source in parallel through the first and second fuses, respectively, when said switch assembly is in the low beam position, and for connecting the high-beam filaments of the first and second headlamps to said power source in parallel when said switch assembly is in the high beam position.

6. A power supply circuit as set forth in claim 5 wherein said current control circuit includes a relay which establishes communication between the first and second headlamps and said power source in series in response to turning ON of said relay.

7. A power supply circuit as set forth in claim 6 wherein said current control circuit includes a transistor for turning said relay OFF in response to turning ON of said transistor.

8. A power supply circuit as set forth in claim 7 comprising means for indicating whether said headlamps are connected to the power source in series or parallel.

9. A power supply circuit for an automotive headlamp system including first and second headlamps comprising:

a power source for supplying electrical power to each of first and second headlamps via first and second fuses;

a switch assembly selectively operable between a first position for supplying a first magnitude electric current to the first and second headlamps through one of the first and second fuses for dimmer lighting, and a second position for supplying a second magnitude electric current greater than the first magnitude to the first headlamp through the first fuse and to the second headlamp through the second fuse;

first circuit means, cooperative with said switch assembly, for connecting the first headlamp through the first fuse to said power source at the second position of said switch assembly; and second circuit means, cooperative with said switch assembly, for connecting the second headlamp through the second fuse to said power source at the second position of said switch assembly and for establishing a series circuit including the first and second headlamps, one of the first and second fuses, and said power source at the first position of said switch assembly, said second means blocking communication between the first and second headlamps and said power source when either of said fuses is open.

10. A power supply circuit as set forth in claim 9 wherein said second means includes a relay for establishing communication between the first and second headlamps and said power source in series in response to turning ON of said relay.

11. A power supply circuit as set forth in claim 10 wherein said second means includes a transistor for turning said relay OFF in response to turning ON of said transistor.

12. A power supply circuit as set forth in claim 11 comprising means for indicating whether the headlamps are connected to said power source in series or parallel.

13. A power supply circuit for an automotive headlamp system including first and second headlamps, each of which includes a low-beam filament for low beam lighting and a high-beam filament for high-beam lighting, comprising:
- a power source for supplying electrical power to each of first and second headlamps via first and second fuses, each headlamp having a low-beam filament for low beam lighting and a high-beam filament for high beam lighting;
- a switch assembly selectively operable between a plurality of switch positions including a first position for supplying a first magnitude electric current to the low-beam filaments of the first and second headlamps through one of the first and second fuses for dimmer lighting, and a second position for supplying a second magnitude electric current greater than the first magnitude to the first headlamp through the first fuse and to the second headlamp through the second fuse, said switch assembly, at the second position, being further operable between a high beam position at which an electric current is supplied to the high-beam filaments of the first and second headlamps and a low beam position at which the second magnitude electric current is supplied to the low-beam filaments of the first and second headlamps;
- first circuit means, cooperative with said switch assembly, for connecting the high-beam filament of the first headlamp to said power source at the high beam position, and the low-beam filament of said first headlamp to said power source at the low beam position when said switch assembly is at the second position; and
- second circuit means, cooperative with said switch assembly, for connecting the high-beam filament of the second headlamp to said power source at the high beam position, and the low-beam filament of the second headlamp to said power source at the low beam position when said switch assembly is at the second position, and for establishing a series circuit including the low-beam filaments of the first and second headlamps, one of the first and second fuses, and said power source at the first position, said second circuit means blocking communication between the low-beam filaments of the first and second headlamps and said power source when either one of said fuses is open.

14. A power supply circuit as set forth in claim 13 wherein said second circuit means includes a relay for establishing communication between the first and second headlamps and said power source in response to turning ON of said relay.

15. A power supply circuit as set forth in claim 14 wherein said second circuit means includes a transistor which turns said relay off in response to turning ON of said transistor.

16. A power supply circuit as set forth in claim 15 comprising means for indicating whether said headlamps are connected to the power source in series or parallel.

* * * * *

UNITED STATES PATENT AND TRADEMARK OFFICE
CERTIFICATE OF CORRECTION

PATENT NO.   : 4,890,038

DATED        : December 26, 1989

INVENTOR(S)  : Kurozu et al

It is certified that error appears in the above-identified patent and that said Letters Patent is hereby corrected as shown below:

On the face of the patent, under the section entitled

[30] Foreign Application Priority Data, change "Jul. 22, 1987 [JP] ........... 62-13126"

to --Jan. 22, 1987 [JP] .......... 62-13126--.

Signed and Sealed this

Ninth Day of July, 1991

Attest:

HARRY F. MANBECK, JR.

*Attesting Officer*   *Commissioner of Patents and Trademarks*